(12) United States Patent
Benlloch Baviera et al.

(10) Patent No.: US 7,476,864 B2
(45) Date of Patent: Jan. 13, 2009

(54) GAMMA RAY DETECTOR WITH INTERACTION DEPTH CODING

(75) Inventors: José María Benlloch Baviera, Valencia (ES); Filomeno Sánchez Martínez, Valencia (ES); Christiph Lerche, Valencia (ES); Noriel Pavón Hernández, Valencia (ES); Marcos Giménez Alvarez, Valencia (ES); Eva Nerina Giménez Navarro, Valencia (ES)

(73) Assignee: Jose Maria Benlloch Bavciera ( * ) Notice: Subject to any disclaimer, the term of this patent is extended or adjusted under 35 U.S.C. 154(b) by 0 days.

(21) Appl. No.: 11/245,992

(22) Filed: Oct. 7, 2005

(65) Prior Publication Data
US 2006/0192128 A1 Aug. 31, 2006

Related U.S. Application Data

(63) Continuation of application No. PCT/ES04/70020, filed on Apr. 7, 2004.

(30) Foreign Application Priority Data
Apr. 10, 2003 (ES) .................. 200300861

(51) Int. Cl.
*G01T 1/20* (2006.01)
(52) U.S. Cl. ............. 250/370.11; 250/370.01; 250/370.09; 250/370.1
(58) Field of Classification Search .......... 250/369
See application file for complete search history.

(56) References Cited
U.S. PATENT DOCUMENTS

| 3,011,057 | A | * | 11/1961 | Anger .................. 250/366 |
| 4,675,526 | A | * | 6/1987 | Rogers et al. .......... 250/363.02 |
| 4,823,016 | A | | 4/1989 | Yamashita et al. |
| 5,122,667 | A | | 6/1992 | Thompson |
| 5,576,546 | A | * | 11/1996 | Gagnon .................. 250/369 |
| 5,813,983 | A | * | 9/1998 | DiFilippo et al. ........ 600/407 |
| 6,124,595 | A | * | 9/2000 | Engdahl et al. .......... 250/366 |
| 6,288,399 | B1 | | 9/2001 | Andreaco et al. |
| 6,459,085 | B1 | | 10/2002 | Chang et al. |

(Continued)

FOREIGN PATENT DOCUMENTS

JP 2000-56023 2/2000

OTHER PUBLICATIONS

Physics of Medical x-Ray Imaging, Chapter 2, http://ric.uthscsa.edu/personalpages/lancaset/DI-II_Chapters/DI_chap2.pdf.*

(Continued)

*Primary Examiner*—David P Porta
*Assistant Examiner*—Yara B Green
(74) *Attorney, Agent, or Firm*—Klauber & Jackson, LLC

(57) ABSTRACT

Gamma ray detector characterised in that its structural elements are a continuous scintillator crystal, a position sensitive photodetector and associated electronics intended to calculate, in addition to the gamma ray energy in the position of its interaction in the crystal, the interaction depth in the crystal from the standard deviation of the scintillation light distribution. Said information may be obtained electronically, in analog form and therefore instantaneous, from the first three moments of the scintillation light distribution. A method for implementing said electronics by way of a network of resistances characterised for analog and simultaneous computation of the first and second distribution moments is also disclosed.

6 Claims, 6 Drawing Sheets

U.S. PATENT DOCUMENTS

| | | | |
|---|---|---|---|
| 6,841,783 B2* | 1/2005 | Malmin | 250/368 |
| 2003/0034455 A1* | 2/2003 | Schreiner et al. | 250/366 |
| 2003/0080298 A1* | 5/2003 | Karplus et al. | 250/370.1 |

OTHER PUBLICATIONS

Burr, KC, etal, Evaluation of a Position Sensitive Avalanche Photodiode for PET, 2003, IEEE Trans on Nuclear Sci., pp. 792-796.

Matthews, KL, etal, A Depth-Encoding Anger Detector Using Scintillating Fibers, 2001, IEEE Trans on Nuclear Sci., pp. 1397-1402.

Huber, JS, etal, An LSO Scintillator Array for a PET Detector Module with Depth of Interaction Measurement, 2001, IEEE Trans on Nuclear Sci., pp. 684-688.

Siegel, S, etal, Simple Charge Division Readouts for Imaging Scintillator Arrays using a Multi-Channel PMT, 1996, I EEE Trans on Nuclear Sci., pp. 1634-1641.

Bartzakos, P etal, A Depth-Encoded PET Detector, 1991, IEEE Trans on Nuc Sci., pp. 732-738.

Seidel, J, etal, Depth Identification Accuracy of a Three-Layer Phoswich PET Detector Module, 1999, IEEE Trans on Nuclear Sci., pp. 485-490.

Yamamoto, S, etal, A GSO depth of Interation detector for PET, 1998, IEEE Trans on Nuclear Sci., pp. 1078-1082.

Liu, H, etal, Development of a depth of Interaction detector for $\gamma$-rays, 2001, Nuclear Instruments and Methods in Physics Research A, pp. 182-190.

* cited by examiner

Part A

Part B

GAMMA RAY DETECTOR WITH INTERACTION DEPTH CODING

RELATED APPLICATIONS

The present application is a Continuation of co-pending PCT Application No. PCT/ES2004/070020, filed Apr. 7, 2004, which in turn, claims priority from Spanish Application Serial No. 200300861, filed Apr. 10, 2003. Applicants claim the benefits of 35 U.S.C. §120 as to the PCT application and priority under 35 U.S.C. §119 as to said Spanish application, and the entire disclosures of both applications are incorporated herein by reference in their entireties.

SECTOR OF THE ART

The present invention belongs to the field of detector physics. It is a device which permits the position of the impact of a gamma ray within a scintillator crystal to be determined, with a high resolution and an image reconstruction with very low parallax error. It has applications in medical physics, detector physics and astrophysics.

STATE OF THE ART

Methods for detecting gamma rays use the effects of radiation on matter to obtain information on it and be able to characterise the radiation field. There exist various types of gamma ray detectors characterised by the type of materials used, standing out among which are those which use scintillating crystals. Scintillation detectors use crystals (NaI, CsI, BGO, LSO, etc.) or liquids and their functioning is based on the excitation of the scintillating material which releases energy emitting photons in the visible energy range and in a quantity proportional to the energy of the incident gamma ray. These photons can be detected by a detector very sensitive to individual photons, which transform the light of the scintillator crystal into an electric signal. Belonging to this group of photodetectors are photomultipliers (PMT), avalanche photodiodes (APD), solid state photomultipliers (SSPM), visible light photon counters (VLPC), hybrid photodiodes (HPD), silicon photomultipliers (SiPM) and silicon photodiodes (PIN photodiodes). The information contained in the signal provided by the photodetector depends very much on the type of said photodetector. For example, a normal photomultiplier without spatial resolution only provides information on the energy of the gamma ray, the interaction instant and its duration. Using photodetectors with spatial resolution (the term position sensitive photodetector and photodetector with spatial resolution used in this specification refers at all times to photodetectors with intrinsic resolution or several photodetectors without resolution grouped to form a position sensitive photodetector) will, in addition to the above variables, also be able to determine the position of the impact of the gamma ray. This latter information is indispensable for capturing gamma ray images in two or three dimensions for their later analysis in a range of fields (gamma cameras in astrophysics, gamma cameras in medical physics, PET, SPECT, calorimeters in the physics of position sensitive particles, radiation monitors and Compton cameras).

The scintillator crystals can be continuous or pixeled. Most designs of gamma ray detectors use pixeled crystals with a scintillator crystal size reduced until an acceptable spatial resolution is obtained. This latter method is very common in detectors used for positron emission tomography (PET).

Independently of their application, scintillator crystals must always have a finite thickness in order to ensure that a high percentage of gamma particles interact with the scintillator crystal. Said finite thickness implies an indetermination in the interaction depth of the gamma ray along it. Not knowing the interaction position of the gamma ray along the perpendicular of the entrance window prevents one from distinguishing among possible lines of incidence which do not have the same angle of incidence or which interact at different depths of the crystal, which produces a parallax error (see FIG. 1).

In detectors with very thick scintillator crystals, a parallax error is introduced when just the positions along the directions falling within the entrance window of the photodetector are determined, since these two directions are not sufficient for reconstructing the real line of incidence of the gamma ray. To prevent this, the angle of incidence or the interaction depth must be known. With current techniques of gamma ray detection it is completely impossible to measure the angle of incidence in any way, which means that the interaction depth must necessarily be determined. Nevertheless, there does not so far exist any gamma ray detector whose resolution at the interaction depth is comparable to its spatial resolution in the other dimensions, which means that an error is always introduced in the position of the origin of the gamma ray.

The parallax error becomes more important the greater the energy of the gamma ray, since thicker scintillator crystals are needed for being able to record a high percentage of the gamma radiation.

For this reason, there exist different approaches for producing a detector that provide information on the interaction depth. One of them is the phoswich method ("Depth of interaction detector block for high resolution positron emission tomography", Nutt Ronald, Andreaco Mark S., Casey Michael E, Williams Charles W., U.S. Pat. No. 6,288,399; "PET detector capable of providing depth directional information", Yamamoto Seiichi, JP Patent: JP2000056023, see also "A GSO depth of interaction detector for PET", Yamamoto S., Ishibishi H., IEEE Transactions on Nuclear Science, Vol. 45 No. 3 1998; "Depth identification accuracy of a three layer Phoswich PET detector module", Seldel J., Vaquero J. J., Siegel S., Gandler W. R.; Green M. V., IEEE Transactions on Nuclear Science, Vol. 46 No. 3 1999), in which different scintillator crystals are simultaneously used which are distinguished in the time length of the scintillation signal. This difference is then used for reconstructing the interaction depth. Another possibility is to introduce absorbent layers between different layers of pixeled scintillators ("Means for measuring the depth interaction of gamma-rays in scintillation crystals in order to improve the spatial resolution of positron imaging systems", Thompson Christopher, U.S. Pat. No. 5,122,667; "A depth encoded PET detector", Bartazkos P., Thompson C. J., IEEE Transactions on Nuclear Science, Vol. 38 No. 2 1991). The absorbent layers reduce the scintillation light by a specific amount, from which the interaction depth can later on be deduced. In both cases, the resolution at the interaction depth is moderate and is limited to values equal to the dimension of the scintillation crystals and is therefore quantised. One method (light-sharing) ("An LSO Scintillator Array for a PET detector Module with depth of interaction measurement", Huber J. S., Moses W. W., Andreaco M. S., Patterson O., IEEE Transactions on Nuclear Science, Vol. 48 No. 3 2001; "Depth of interaction system in nuclear imaging", Chang Wei, Ordonez Caesar, Matthews Kenneth, U.S. Pat. No. 6,459,085) which provides a measure of the unquantised interaction depth is the use of additional photodetectors and the determination of that parameter starting from the sharing out of the scintillation light between the two photodetectors.

There also exist detectors ("Depth-of-interaction normalisation of signals for improved positioning, and energy resolution in scintillation camera", Gagnon Daniel, U.S. Pat. No. 5,576,546; "Depth-of-interaction and other high order moments filtering for improved detection in thick scintillation crystals;" Dililippo Frank P., Gagnon Daniel, U.S. Pat. No. 5,813,983; "A depth- encoding Anger detector using scintillating fibers," Matthews Kenneth L., Lenoard Scott M., Ordonez Caesar E., Perysk Dennis E., Chang Wei, IEEE Transactions on Nuclear Science, Vol. 48 No. 4 2001) which use the width of the distribution of the scintillation light for determining the interaction depth, exploiting the fact that the scintillation light is distributed isotropically which gives rise to different densities of light at different points of the scintillator. As a result a distribution of scintillation light is obtained whose width permits the interaction depth of the gamma ray to be deduced.

There are two methods known for determining the width. The first is to calculate the standard deviation following the detection of the quantity of light in different places using several photodetectors. These signals are later digitised and the standard deviation is calculated starting from them by means of specific software. Given that the photodetectors used so far are normally of a dimension comparable to the actual width of the scintillation light, the variation in standard deviation with depth is very small, which does not allow the depth to be determined with precision. Also, a large number of electronic channels are needed along with a considerable computational effort for doing this. The second method avoids these problems by using optical fibres (wavelength shifting fibres) which guide the light from the scintillator crystal towards an additional position sensitive photodetector. With the aid of this additional photodetector and establishing a detection threshold in the fibre, the width of the scintillation light distribution can be estimated. Nevertheless, the light trapped in these fibres has very little intensity, thereby it displays major statistical fluctuations which in turn prevents any measurement of the interaction depth with precision.

Other ideas not classified in the above paragraphs can be consulted in the following references: "Scintillation detector for three-dimensionally measuring the gamma-ray absorption position and a position CT apparatus utilizing the Scintillation detector," Shimtzu Keiji, Omura Tomohide, Uchida Hiroshi, Yamashita Takaji, U.S. Pat. No. 4,823,016; "Gamma ray imaging detector with three dimensional event positioning and method of calculation", Knoll Glenn F., Engdahl John C., Rogers William L, U.S. Pat. No. 6,124,595; "Development of a depth of interaction detector for gamma-rays", Liu H., Omura T., Wanalabe M., Yamashita T, Nuclear Instruments & Methods in Physics Research, Section A. Vol. 459 2001.

Moreover, the acquisition electronics forms an essential part of any gamma ray detector. Its function is to convert the electric signals provided by all the photodetectors into digital information accessible by computer, which permits reconstruction of the images. To achieve this, the signals from the photodetectors have to be digitised and used for calculating the information required such as energy, position and depth of interaction. It is also possible to calculate these same parameters of interest analogically and before digitisation, which drastically reduces the number of electronic channels needed and consequently the cost and noise of the electronics. For that end, different networks of resistances are used, both one and two dimensional, such as Anger logic, the proportional resistance network or a combination of both, the hybrid resistance network ("Simple Charge Division Readouts for Imaging Scintillator Arrays using a Multi-Channel PMT", S. Siegel, R. W. Silverman, Y. Shao, S. R. Cherry, IEEE Trans. Nucl. Sci. Vol. 43, No. 3, June 1996). These circuits consist of a chain or matrix of resistances acting as load dividers and connected to the photodetectors (or the different outputs in the case of a position sensitive photodetector) and they instantaneously provide the interaction point (centroid) and the energy of the gamma ray. On account of its simplicity and low cost it is the method most used for the time being, though no network provides information on the depth of interaction in its original design. In the present invention modifications are proposed for the different networks of resistances which also permit measurement of the second moment of the scintillation light distribution with the same networks of resistances without losing energy and the centroid.

The desirable thing is for the electronics to carry out the processing very quickly, since the time used for the conversion contributes to the dead time of the entire detector, which means that fast electronics allows greater detection efficiency. It is also preferable to have electronics with the minimum possible components since each component increases the cost of the whole electronics and introduces a statistical error (electronic noise) which adds on to the noise caused by the rest of the components. In general, electronic designs which analogically calculate the parameters of interest (such as the networks of resistances mentioned above) comply well with these two requirements but they normally introduce systematic errors, while electronic designs which digitise the signals before calculating the parameters are normally much slower and complicated, but they permit systematic errors to be avoided in a better way.

With the present invention, the aim is to develop a gamma ray detector with high resolution in the interaction depth and which we are going to describe in the following section.

DESCRIPTION OF THE INVENTION

Brief Description

This invention describes a design of gamma ray detector characterised in that its structural elements are as follows: a continuous scintillator crystal, a position sensitive photodetector and associated electronics intended to calculate, in addition to the gamma ray energy and the position of its interaction in the crystal, the interaction depth in said crystal from the standard deviation of the scintillation light distribution.

Said gamma ray detector provides information on the three-dimensional position of the interaction point of the gamma ray inside the continuous scintillator crystal. Said information may be obtained electronically, in analog form and therefore instantaneous, from the different moments of the scintillation light distribution.

Also described is a way of implementing said invention by means of specific electronics characterised by analogically calculating the $1^{st}$ moment of the distribution and simultaneously the $2^{nd}$ moment of the distribution without affecting the calculation of the $1^{st}$ moment of the distribution. In order to calculate the $2^{nd}$ moment a voltage adder is used in the interconnection points of the resistances as shown in FIG. 4. The standard deviation starting from the $2^{nd}$ moment is carried out by means of specific software.

Detailed Description

The object of the invention is a gamma ray detector characterised in that its structural elements are as follows: a continuous scintillator crystal, a photodetector (photomultipliers (PMT), avalanche photodiodes (APD), solid state photomultipliers (SSPM), visible light photon counters (VLPC), hybrid photodiodes (HPD), silicon photomultipliers (SiPM) and silicon photodiodes (PIN photodiodes)) sensitive to position and associated electronics permitting, in addition to the energy of the gamma ray and the positions of its interaction in the crystal, also the depth of interaction therein to be calculated from the standard deviation of the distribution of the scintillation light.

A diagram of the present invention can be seen in FIG. 3:
1) Continuous scintillator crystal
3) photodetector sensitive to the light from the scintillator crystal and to position
5) electronics board permitting the interaction depth to be determined, 2) being optical grease and 4) being the entrance window of the photomultiplier.

There do not exist any gamma ray detectors based on continuous crystals and a single position sensitive photodetector which provide information on the interaction depth of the gamma rays in the crystal.

The gamma ray detector with interaction depth coding provides the three-dimensional position of the impact of the gamma ray inside the continuous scintillator crystal instead of the two-dimensional position of normal gamma ray detectors.

The scintillation light generated by the impact of the gamma ray is distributed isotropically within the scintillation crystal, provided it is continuous, and, by two-dimensional projection, it causes a characteristic distribution in the entrance window of the position sensitive photodetector, where the point with the highest density of light is the projection of the impact position. Moving away from the plane of the entrance window of that point, the density of the light decreases. This decrease contains information on the depth of interaction, given that the light distribution becomes wider to the degree that the interaction point moves away from the entrance window (see FIGS. 1 and 2). From the statistical point of view, this corresponds to an increase in standard deviation, which in turn corresponds to the $2^{nd}$ moment of the distribution with respect to the mean.

For the present invention to be able to use the scintillation light distribution it is essential to use continuous crystals, since cuts in the crystal or reflecting layers destroy the distribution. It is also necessary to use segmented photodetectors, with the dimension of the segments being considerably less than the width of the light distribution, in order to take samples of the distribution.

The distribution of the light in the entrance window of the photodetector is made up of intervals of extension corresponding to the dimensions of the same photodetector segments and will then be converted into electric signals. This set of measurements can be used for the complete reconstruction of the light distribution by means of adjustments or for the determination of characteristic properties of the distribution (e.g., $1^{st}$ moment, $2^{nd}$ moment and area). The $1^{st}$ moment is normally calculated with one of the possible networks of resistances mentioned earlier (Anger logic, proportional resistance network or their combination) and it is extracted from the network of resistances in the form of currents linearly coded with the position of the centroid of the two-dimensional projection, while the $2^{nd}$ moment is weighted up with the distance between two elements of the detector and, together with the $1^{st}$ moment, permits the reconstruction of the standard deviation following its digitisation. Said standard deviation is automatically coded with the interaction depth of the gamma ray.

In the case of position sensitive avalanche photodiodes ("Evaluation of a Position Sensitive Avalanche Photodiode for PET", K. C. Burr, A. Ivan, J. LeBlanc, S. Zelakiewicz, D. L. McDaniel, C. L. Kim, A. Ganin, K. S. Shah, R. Grazioso, R. Farrrell, J. Glodo, IEEE Transaction on Nuclear Science, Vol. 40, No. 4 August 2003), the photodiode contains a resistive layer which permits currents linearly coded in position to be extracted at the four ends of the photodiode. In this way, no coupled resistance network is required, since the resistive layer replaces it and permits the calculation of the centroids starting from the four currents extracted at the ends. Nevertheless, the position sensitive avalanche photodiodes do not permit the computation of the $2^{nd}$ moment in their current form and require modification equivalent to that required for the network of resistances in order to permit measurement of the interaction depth.

Current theories on obtaining the interaction depth are normally based on physical effects such as absorption of the scintillation light, light-sharing, the extension of the scintillation light projection by means of using optical fibres (wavelength shifting fibres) and additional detectors or phoswich technology. The problems with these techniques, in all cases are that not only are the resolutions moderate at the interaction depth but also they are complicated and costly detectors to build and their electronics is complex.

The determination of the interaction depth in the present invention permits correction of the two-dimensional position in the plane of the entrance window determined by extraction of the centroid, since the centroid is only an approximation to the real position and it depends on the distance from the plane of the window of the photodetector to the position of the impact of the gamma ray within the scintillator crystal.

Therefore, the determination of the interaction depth makes it possible to reduce the parallax error and it will also improve the spatial resolution of the gamma ray detector by means of a later correction using specific software. This correction is possible because the dependence of the centroid with the interaction depth can be parametrised analytically and, therefore, permits its compensation once the interaction depth is known. For this form of constructive improvement, the use of continuous scintillator crystals with large dimensions is unavoidable. Owing to the segmented crystal design of the majority of gamma ray detectors providing an estimate of the interaction depth, the same information does not allow any improvement in the spatial resolution of the detector, since the distribution of the light is destroyed in exchange for a better light-yield.

Obtaining the interaction depth with less error will allow a more efficient reduction in the parallax error.

The gamma ray detector forming the object of the invention, which provides information on the three-dimensional position of the interaction point of the gamma ray inside the continuous scintillator crystal, is essentially characterised in that the stated information is obtained electronically, in analog form and therefore instantaneous, on the basis of the different moments of the scintillation light distribution, detected with any position sensitive photodetector or array of photodetectors.

The information on the interaction depth is obtained from the standard deviation of the scintillation light distribution, a characteristic of the scintillation light in detectors with continuous scintillation crystals. Instead of multiple photodetectors, the proposed detector can use a single position sensitive photodetector, with the size of the elements comprising it being less than the typical width of the scintillation light distribution, which means that a variation in the width causes an appreciable variation in the set of electric signals from the single position sensitive photodetector.

Therefore, the detector proposed in this invention (see FIG. 3) determines the two-dimensional position of the impact of the gamma ray in the plane of the entrance window of the single position sensitive photodetector and also the interaction depth of the gamma ray within the scintillator crystal, with a single photodetector without any need to use additional detectors or scintillator crystals.

An additional object of the present invention is a modification to existing networks of resistances characterised by analogically computing the $1^{st}$ moment of the distribution which permits a simultaneous calculation of the $2^{nd}$ moment of the distribution without affecting the computation of the $1^{st}$ moment of the distribution. For the case of position sensitive avalanche photodiodes, the modification is such that it uses the involved resistive layer of these devices.

To calculate the $2^{nd}$ moment, in all cases a voltage adder is used at the interconnection points of the resistances as shown in FIG. 4. For the avalanche photodiodes electrical contacts would be connected to the resistive layer of the PSAPD (see FIG. 5) in such way that the distance between them is the same for each pair of contiguous contacts. These contacts supply the signal for the adder. The number of such contacts is limited only by their size and the size of the PSAPD. The calculation of the standard deviation starting from the $2^{nd}$ moment is carried out by means of specific software.

That light distribution is converted into a current distribution by a position sensitive photodetector and is analogically pre-processed by a network of resistances directly connected to the outputs from the same photodetector which simultaneously and without interference extracts the first and second moment of that distribution.

In the present invention, the information on the $2^{nd}$ moment of the light distribution, weighted with the distance between the elements of the detector, is obtained from a network of resistances (Anger network, proportional resistance network of mixture of them) modified with an analog adder.

The gamma ray detector that is proposed uses electronics consisting of one of the possible modified networks of resistances which simultaneously calculates the centroid corresponding to the $1^{st}$ moment of the distribution of the scintillation light and which will be obtained in the usual way by an Anger, proportional, or hybrid resistance network, and the $2^{nd}$ moment of the scintillation light distribution which arrives at the entrance window of the position sensitive photodetector (see FIG. 2). The $2^{nd}$ moment is an excellent estimation of the interaction depth, with a resolution being obtained that is comparable to the resolution of the centroid, since it permits the calculation of the standard deviation of the light distribution.

The reading of the signals from the segmented photodetectors is done in the present invention by means of a network of equal resistances connected together (see FIG. 4) or, in the case of PSAPDs, with their resistive layer (see FIG. 5). The currents injected in the inputs of the network are divided according to the sharing of the resistances and depending on the position of the injection point within that network. Next, the different fractions of each connection point are superposed for being read at the two ends of the network ($J_l$ and $J_r$ in FIG. 4). The superposition of the fractions of the currents computes the centroid of the distribution of the light detected by the photodetector. That information is, together with the area of the distribution, the only information exploited in existing Anger detectors. In the case of PSAPDs, the signal is established in the same way with the sole difference that the resistive layer of the PSAPDs acts like a two-dimensional network of resistances that is continuous instead of being discrete. The resistances which are seen by a current injected in any point of the PSAPD with respect to the four outputs are proportional to the distances between the injection point and the outputs.

Nevertheless, the same currents injected by the photodetector into the network or the resistive layer cause potentials at the connection points of the network of resistances, which are square coded with the position of the point in that network. These voltages can be used for measuring properties of the distribution as well as their $1^{st}$ moment and without destroying it, on condition that the measurement of the voltages does not affect the currents produced by them.

The superposition of all the voltages at the different connection points of the network of resistances corresponds to the $2^{nd}$ moment of the light distribution. This sum will be used in this invention for calculating the standard deviation of the light distribution. Although each one of the injected currents causes voltages at all injection points of the network of resistances, this fact does not destroy the square coding of the sum of the voltage, instead it results solely in a multiplying factor independent of the position of the injected current. The sum of the voltages can be extended to any number of anode segments, provided the adder circuit is working correctly.

In the present case of the improved detector for gamma rays with interaction depth coding, the sum carried out analogically signifies an instantaneous calculation of the $2^{nd}$ moment and, therefore, it only requires a small additional processing following its digitisation. Also, the determination of the second moment in analog mode implies just a few supplementary electronic devices since the square coding is established automatically by the network of resistances or the resistive layer and the sum is performed with operational amplifiers. Therefore, the modification of the possible networks of resistances or of the PSAPD gives rise to insignificant costs.

Finally, the currents exiting from the ends of the networks of resistances of from the PSAPD and the sum of the voltages at the interconnection points are digitised in the usual way and processed by software. In particular, the difference between the square of the $1^{st}$ moment and of the $2^{nd}$ moment with the aim of determining the standard deviation has to be done by means of specific software after their digitisation. Similarly, the reconstruction of the interaction depth will be done starting from the standard deviation by means of specific software.

Owing to the fact that the information on the interaction depth will be obtained from the standard deviation of the light distribution according to claim 1 and using improved interanodic networks according to claim 2, the information obtained on the interaction depth will be continuous. In other words, the information will not be quantised by the way it is obtained as in the phoswich method or using absorbent layers between different crystals.

Neither scintillator crystals nor additional photodetectors are needed for obtaining this information. There does not currently exist any detector which provides information on interaction depth without using additional photodetectors or crystals.

A particular object of the present invention is the use of the device described above in producing a positron emission tomography camera and in the production of a gamma camera, which permits the parallax error to be considerably reduced.

An additional object of the present invention is the use of the device described above in producing a detector for particle physics and astrophysics, which permits the parallax error to be considerably reduced. The gamma ray detector that has been described can be used for any situation in which the detection of gamma rays (particles) needs to be known with greatest possible exactitude. In particle physics, the energies of gamma rays cover a broad range of values. The parallax error will be greater for higher energies in gamma ray detectors that use scintillators, since their thickness has to be sufficiently large for guaranteeing a reasonable efficiency. Particularly in research, detectors with excellent resolution are required, a condition that is met by the gamma ray detector presented here, since it drastically reduces the parallax error and permits the correction of the centroids using the depth of interaction.

Another type of gamma ray detector is the Compton camera. Its functioning principle consists of inducing Compton scattering within a target in the form of a semiconductor block. This semiconductor is in turn a detector which records the position of the scattering along with the energy transferred to the target. The scattered gamma ray is recorded in a total absorption detector. This detector has to completely absorb the scattered gamma ray and measure its remaining energy along with the position of the absorption, and it normally uses scintillators in combination with photodetectors. Owing to Doppler Broadening, the Compton camera achieves an acceptable resolution only for gamma ray energies comparable to 511 keV or more in positron emission tomography, which means that the absorption detector requires very thick scintillator crystals which suffer from parallax error. Also, while scattering detectors (semiconductors) can be very small in size, absorption detectors have to cover a large angle. The gamma ray detector presented here meets all these requirements of the absorption detectors, and can therefore be used in Compton cameras.

EXAMPLES OF EMBODIMENT OF THE INVENTION

Example 1

Figure 6:
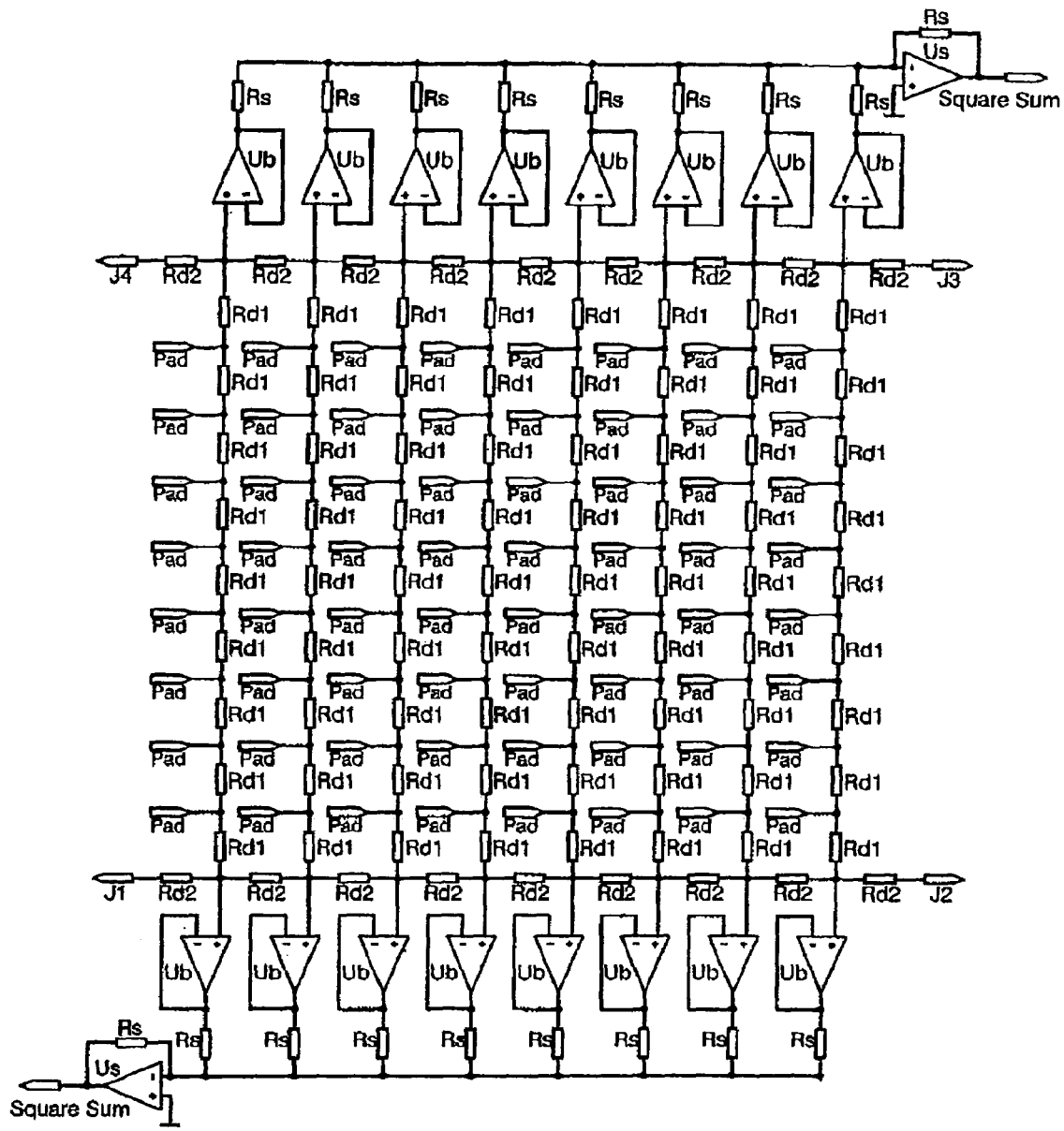
FIG. 6: Example of embodiment of the invention for a position sensitive photomultiplier of the multi-anode type with two-dimensional proportional resistance network and one-dimensional adder.

Gamma Ray Detector with Interaction Depth Coding for Photomultipliers of the Multi-Anode Type with Two-Dimensional Proportional Resistance Network and One-Dimensional Adder (FIG. 6)

Figure 1:
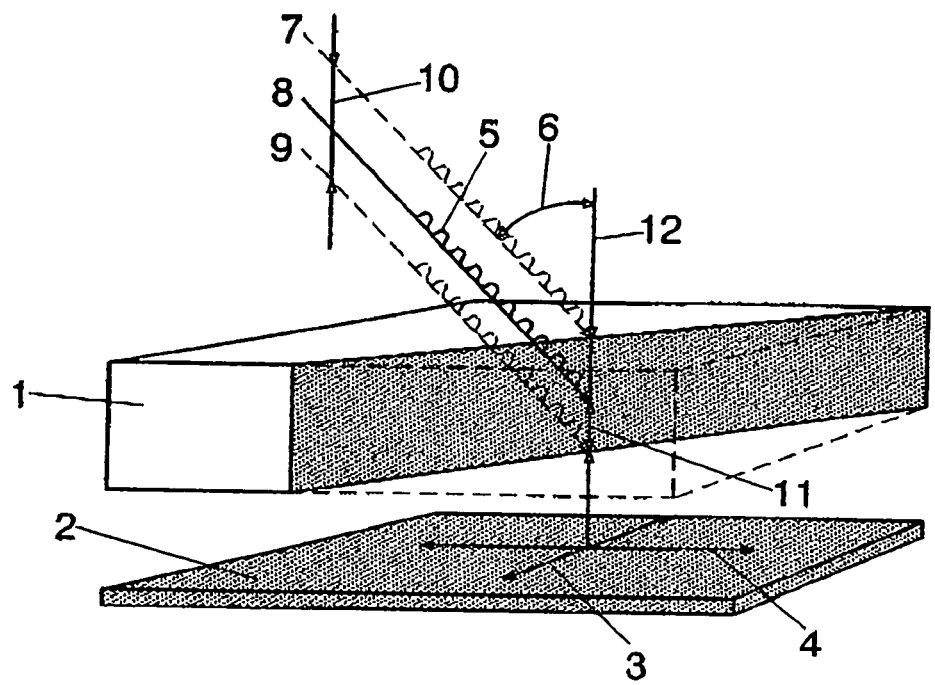
FIG. 1: Explanation of parallax error: very thick scintillator (1); entrance window for photodetector (2); spatial directions defined by the centroid (3) and (4); of the gamma ray (5); line of real incidence of the gamma ray (8); other possible lines of incidence (7), (9); perpendicular of the entrance windows (12); parallax error (10); angle of incidence (6); interaction depth (11).
Figure 2:
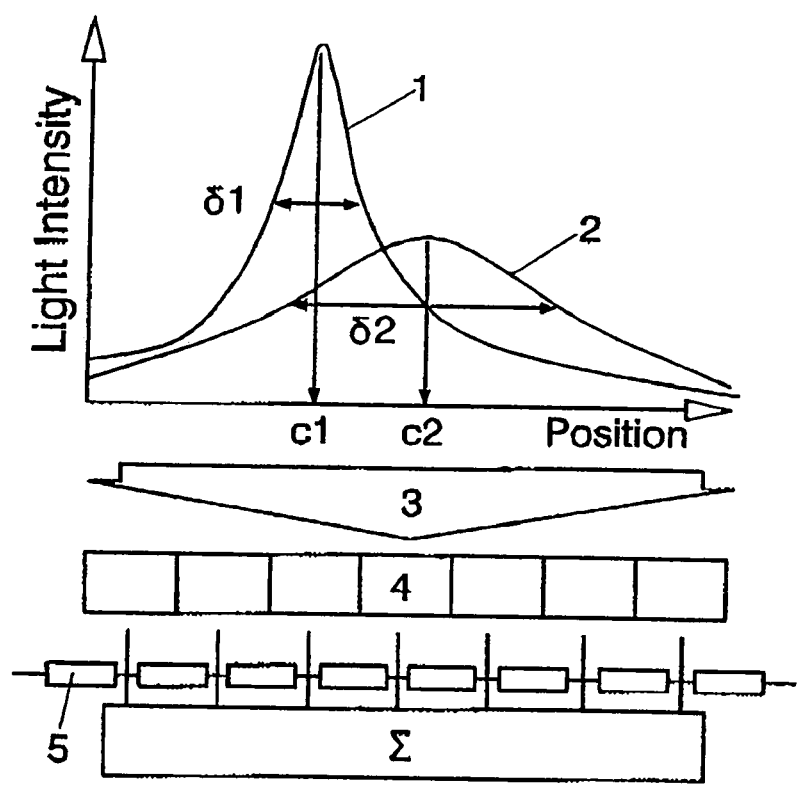
FIG. 2: Illustration of the distributions of the scintillation light for two different interaction depths and the position of the detector elements (in one dimension only, for reasons of clarity). Two different light distributions (1) and (2) with their corresponding widths ($\sigma 1$) and ($\sigma 2$) and their corresponding centroids c1 and c2; light-guides (3), segmented photodetector (4); modified Anger logic (5).
Figure 3:
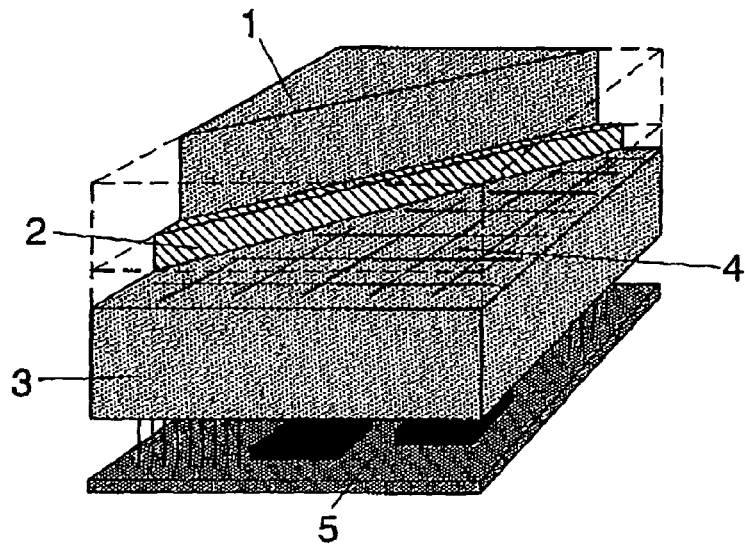
FIG. 3: Assembly diagram of the gamma ray detector with interaction depth coding: continuous scintillator crystal (1); optical grease layer (2); segmented photodetector (3); entrance window for photodetector (4); electronic board (5).

The mechanical assembly of the example is shown in FIG. 3. The detector will consist of a scintillator crystal, necessarily continuous and very thick. This crystal is coupled on its polished side by means of optical grease of intermediate refractive index to the entrance window of the photomultiplier. The remaining sides of the scintillator crystal not coupled to the photomultiplier are painted black (absorbent) to prevent the destruction of the shape of the scintillation light distribution due to reflections of the light at the edges.

In the anodes of the photomultiplier, known as pads, currents are injected proportional to the quantity of the fraction of scintillation light in that zone of the entrance window. Said pads are separately connected to the connection points of the resistances of the two-dimensional interanodic network (see FIG. 6). The two centroids are formed in a different way. First the centroid for the "y" direction is formed by means of resistance chains Rd1. These currents are weighted with the "y" position and are then collected by means of two resistance chains Rd2 which form the centroid for the "x" direction. Finally, they reach the outputs J1, . . . , J4, where they are digitised in order to determine the two-dimensional position of the impact.

Simultaneously, the currents weighted with the "x" position produce voltages at the connection points of the networks formed by the resistances Rd2, square coded with the position of the same point within the network of resistances. The voltages are amplified by means of voltage monitors (Ub) in order to prevent overly high current extractions from the network of resistances. Nevertheless, these amplifiers are not strictly necessary for the functioning of the circuit and they only serve to improve the measurement. Next, these voltages are added with equal weight by means of an adder formed from the resistances Rs1 and Rs2 and an operational amplifier Us, which at its output provides the $2^{nd}$ moment of the light distribution. Following the digitisation it can be used for calculating the standard deviation of the light distribution, using a simple arithmetic formula which relates the voltages measured with their corresponding currents, depending solely on the value of the resistance Rd2 and on the number of anodes of the photomultiplier.

It is sufficient to determine the standard deviation of the light distribution along one direction only, since the distribution of the scintillation light is approximately symmetric to the rotation with respect to any axis running through the position of impact of the gamma ray. Nevertheless, the $2^{nd}$ moment of the distribution will be determined twice, each of the two at one end of the two-dimensional resistance network (see FIG. 6). Although this is not strictly necessary, it leads to an improvement in the resolution due to calculation of the mean of the two measurements of the interaction depth, owing to the fact that its determination is not equally efficient for the entire plane of the entrance window.

Monte Carlo simulations have been conducted in order to check the correct functioning of the described method, both for the distribution of the scintillation light for a crystal and a typical detector, and for the electronic circuit. As a result of a simulation for a supposed detector in positron emission tomography (consisting of a continuous crystal of Lutetium OxyorthoSilicate and a large area position sensitive photomultiplier), a resolution at the interaction depth of 2.3±0.5 mm was obtained for specific interactions.

Example 2

Figure 7:
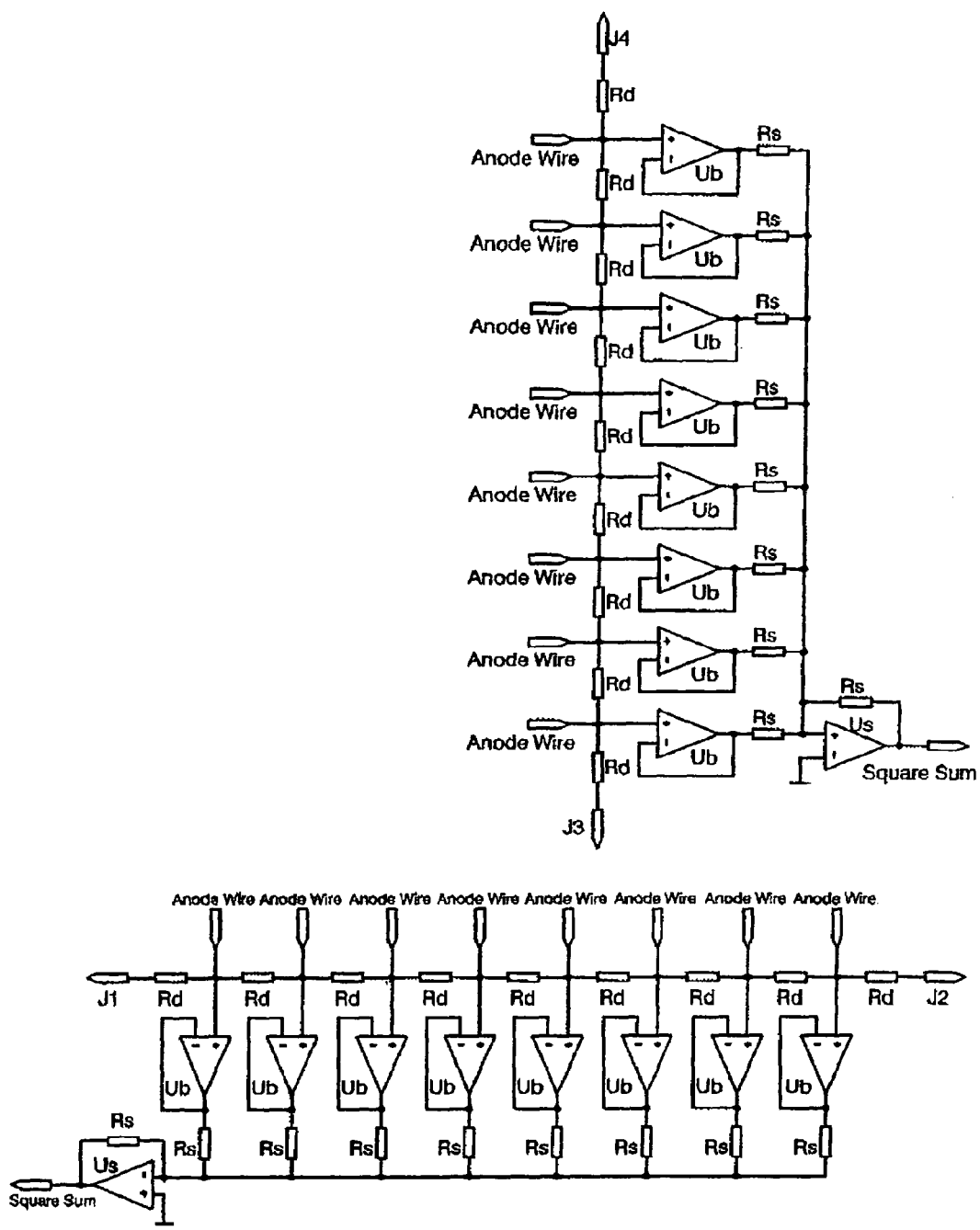
FIG. 7: Example of embodiment of the invention for a position sensitive photomultiplier of the crossed wire anodes or crossed plate anodes type with one-dimensional proportional resistance network and one-dimensional adder.

Gamma Ray Detector with Interaction Depth Coding for Photomultipliers of the Crossed Wire Anodes or Crossed Plate Anodes Type with One-Dimensional Proportional Resistance Network and One-Dimensional Adder (FIG. 7)

The mechanical assembly of the detector is the same as in the previous case (see FIG. 3). Owing to the different shape of the anodes (crossed wire anodes or crossed plate anodes), the network of resistances is of another type. Two identical interanode networks are used that are entirely independent of each other, each for one group of anodes corresponding to one spatial direction (see FIG. 6).

The currents of the photomultiplier are injected in the two networks of resistances in the inputs. The resistances referred to as "Rd" in FIG. 6 calculate the centroids of the light distribution along the two space directions. The operational amplifiers "Ub" in FIG. 6 are used as voltage monitors and the resistances "Rs1" and "Rs2", together with the operational amplifiers "Us", form the adder circuit. In this example too, the amplifiers "Ub" are not strictly necessary for the functioning of the circuit and they only serve to improve the measurement. The position of the interaction of the gamma ray within the scintillator crystal will be able to be deduced from the currents "J1" to "J4" and the depth of interaction from the square sum voltages (see FIG. 7).

The functioning principle of the network is analogous to the previous example. The outputs from the photomultiplier for one spatial direction are connected to the inputs known as "Anode Wire" (see FIG. 7). The first and second moments are formed in the same way by means of sharing and superposition of the injected currents.

Again, two samples of the standard deviation are taken in order to minimise measurement error, with the mean of the two measurements being evaluated. A resolution at the interaction depth of 2.5±0.5 mm was obtained for specific interactions by means of simulation.

Example 3

Figure 8:
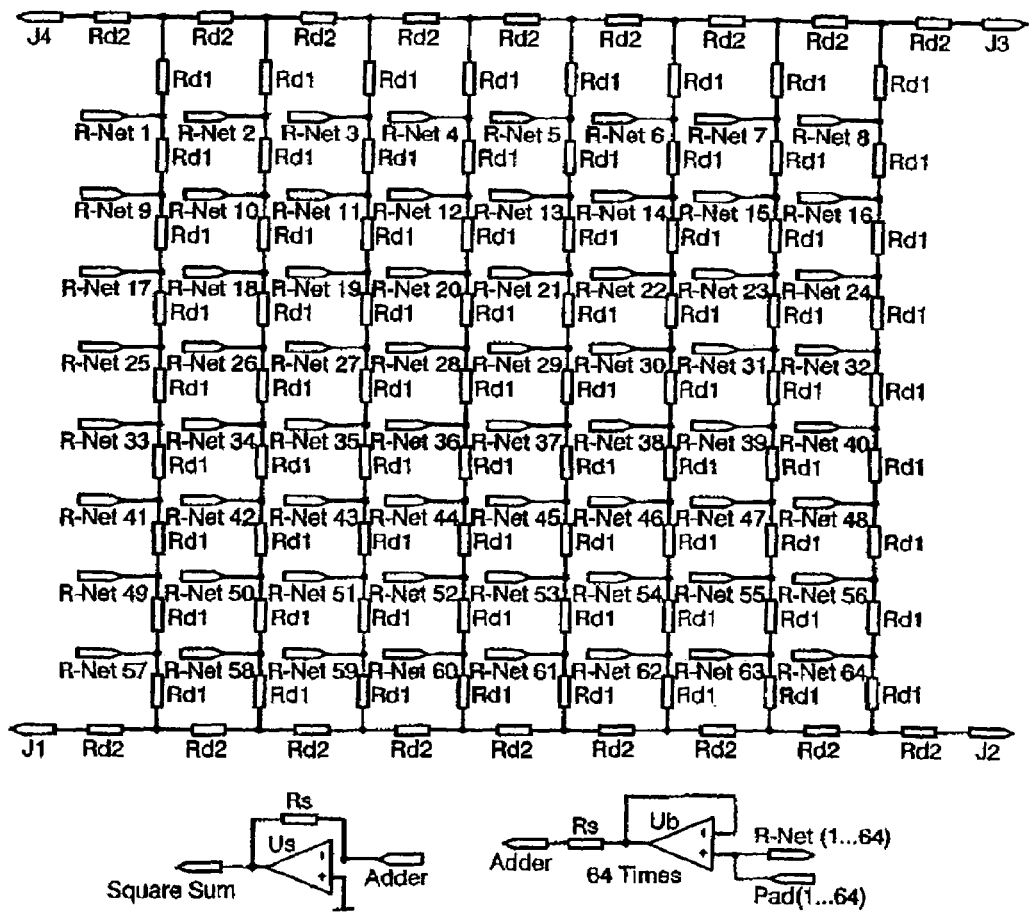
FIG. 8: Example of embodiment of the invention for a position sensitive photomultiplier of the multi-anode type with two-dimensional proportional resistance network and two-dimensional adder.

Gamma Ray Detector with Interaction Depth Coding for Photomultipliers of the Multi-Anode Type with One-Dimensional Proportional Resistance Network and Two-Dimensional Adder (FIG. 8)

Figure 4:
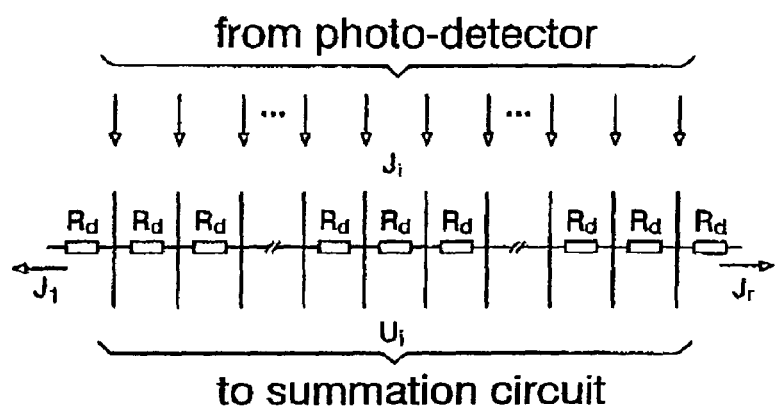
FIG. 4: Diagram of the interanodic network of resistances: currents injected by the photodetector: $J_i$; components of the network of resistances: $R_{r,i}$; voltages at the interconnection points of the resistances $U_i$.
Figure 5:
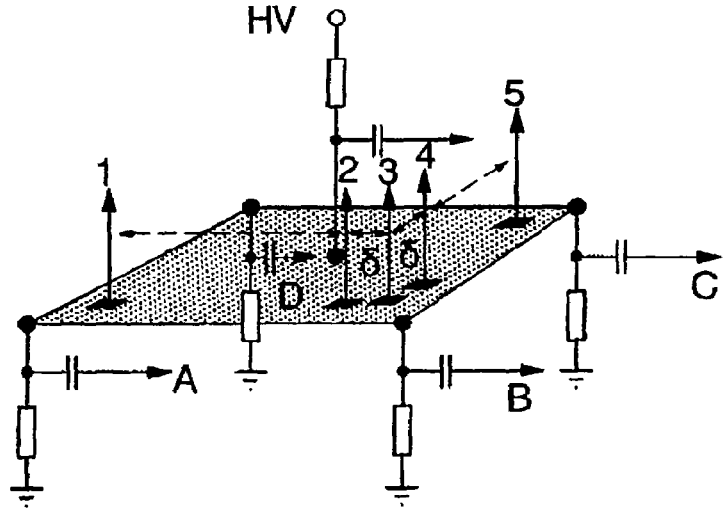
FIG. 5: Implementation of measuring the second moment of the light distribution for position sensitive avalanche photodiodes. A PSAPD is used which determines the centroids of the light distribution in a known way starting from the output signals A, B, . . . , E. Since the PSAPD has a resistive layer which carries out the linear coding of the currents extracted at the ends, the voltage that is generated along the resistive layer of PSAPD caused by the currents will be square coded, always provided the distances 6 between the points 1, 2, 3, 4, 5 (or more) where the voltages are measured are the same between contiguous points. The voltages will then be summed with an adder the same as that which would be used with resistance networks. Optionally, power amplifiers can be used for the measurement points of the voltages (1, 2, . . . , 5) in order to improve the result if the input impedance of the adder is too low for ensuring that the information from the centroids will not be destroyed.

The mechanical assembly of the detector is the same as in the previous cases (see FIGS. 4 and 5). In the anodes of the photomultiplier, known as pads (1 . . . 64), currents are injected proportional to the quantity of the fraction of scintillation light in that zone of the entrance window. Said pads are separately connected to the connection points of the resistances of the two-dimensional interanodic network referred to as R-Net (1 . . . 64) and power amplifiers in order to prevent overly high "Ub" current extractions (se FIG. 8). The centroids are determined using the currents J1 . . . J4 as in the example of embodiment 1. As in the previous examples, the amplifiers are optional for improving the measurement and are not strictly necessary for the correct functioning of the adder. The voltages of the points R-Net (1 . . . 64) are added with the circuit formed from the "Us" amplifiers and the "Rs" resistances thereby establishing the square sum signal which is proportional to the second moment. Given that with this network more measurements are made of the voltage coded in width of the light distribution, the measurement error will therefore be less.

Example 4

Figure 9:
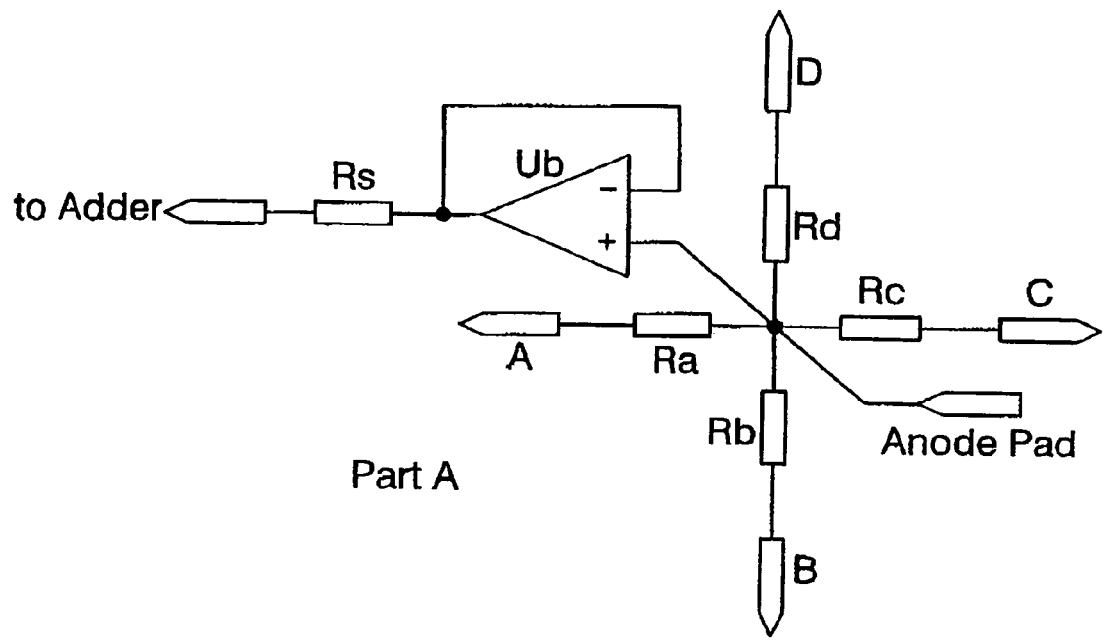
FIG. 9: Example of embodiment of the invention for a position sensitive photomultiplier of the multi-anode type with Anger resistance network and one-dimensional adder.
Figure 9:
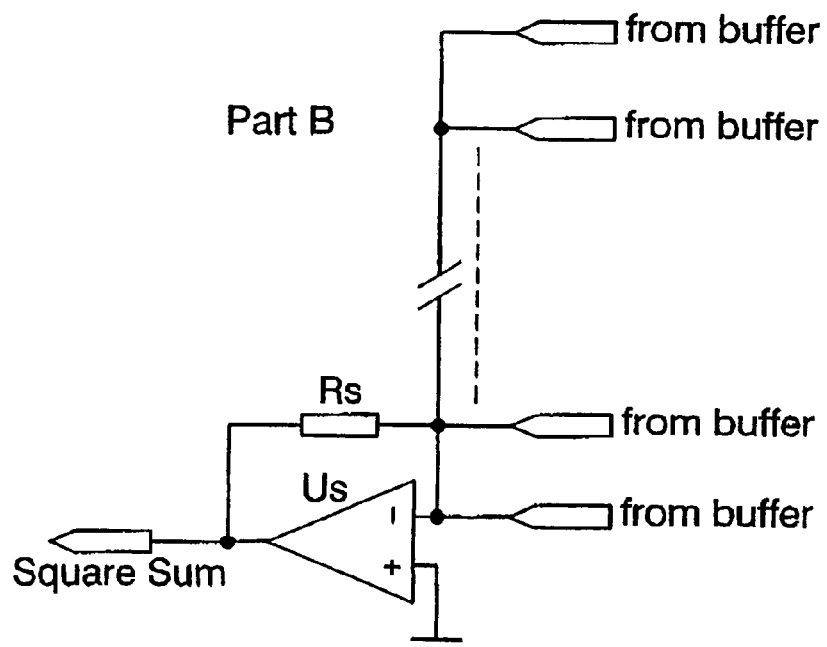

Gamma Ray Detector with Interaction Depth Coding for Photomultipliers of the Multi-Anode Type with Anger Resistance Network and Two-Dimensional Adder (FIG. 9)

The mechanical assembly of the detector is the same as in the previous cases (see FIGS. 4 and 5) but in this example of embodiment the Anger network of resistances is used. In order to measure the centroids, the resistances "Ra" and "Rc" are adjusted in such way that a linear coding is obtained of the currents measured at points "A" and "C". In the same way, the resistances "Rb" and "Rd" are adjusted in such way that a linear coding is obtained of the currents measured at points "B" and "D" ("Part A" in FIG. 9). This method of determination is used in commercial gamma cameras. As in the proportional resistance network described earlier, the linear coding of the currents causes a square coding of the voltages at the connection points of the segment of the anodes ("Anode Pads") which once again can be used to measure the second moment. For that reason, these voltages are summed with the circuit formed by the amplifier "Us" and the resistances "Rs" ("Part B" in FIG. 9) establishing the square sum signal which is proportional to the second moment. Voltage monitors "Ub" can optionally be used for improving the measurement as in the above examples. Given that with this network more measurements are made of the voltage coded in width of the light distribution, the measurement error will therefore be less.

The invention claimed is:
1. A gamma ray detector comprising:
a continuous scintillator crystal,
a position sensitive photo-detector, or a plurality of photo-detectors, and analogue electronics,
digital electronics;
wherein said analogue electronics comprises means to calculate analogically, and therefore instantaneously, at least the first three consecutive moments, starting with the $0^{th}$ moment of the scintillation light distribution; and said digital electronics comprises means to digitalize the moments computed analogically and to obtain the three-dimensional position of the interaction point of the gamma ray inside the continuous scintillating crystal, starting from the moments.

2. The gamma ray detector according to claim 1, wherein the photo-detector is selected from a single position sensitive photomultiplier tube (PSPMT), an array of PSPMTs, an array of avalanche photodiodes (APDs), an array of Silicon Photo-Multipliers (SiPMT), and any array of photo-detectors.

3. The gamma ray detector according to claim 1, wherein the photo-detector is a position sensitive avalanche photodiode (PSAPD) and wherein the analogue electronics comprises additional contacts established with the resistance layer of the PSAPDs at points equidistant between them and a voltage adder that analogically and simultaneously calculates the 2nd moment of the scintillation light distribution without affecting the calculation of the total collected charge, energy of the gamma ray, and the centroids starting from the current extracted from the 4 corners of the PSAPD.

4. A positron emission tomography camera that comprises the gamma ray detector defined in claim 1.

5. A gamma ray detector with spatial resolution for particle physics, and astrophysics that comprises the gamma ray detector defined in claim 1.

6. A gamma ray detector for the absorption detector used in Compton cameras that comprises the gamma ray detector defined in claim 1.

* * * * *

UNITED STATES PATENT AND TRADEMARK OFFICE
CERTIFICATE OF CORRECTION

PATENT NO.        : 7,476,864 B2
APPLICATION NO. : 11/245992
DATED             : January 13, 2009
INVENTOR(S)       : Jose Maria Benlloch Baviera et al.

It is certified that error appears in the above-identified patent and that said Letters Patent is hereby corrected as shown below:

On the title page item (73), should read: Consejo Superior De Investigaciones Cientificas and Universidad De Valencia Signed and Sealed this Twenty-second Day of December, 2009

David J. Kappos
*Director of the United States Patent and Trademark Office*